US008233000B1

(12) United States Patent
Diard (10) Patent No.: US 8,233,000 B1
(45) Date of Patent: Jul. 31, 2012

(54) SYSTEM AND METHOD FOR SWITCHING BETWEEN GRAPHICAL PROCESSING UNITS

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1013 days.

(21) Appl. No.: 11/937,468

(22) Filed: Nov. 8, 2007

(51) Int. Cl.
*G06F 15/16* (2006.01)
*G06F 1/00* (2006.01)
*G06F 1/26* (2006.01)
*G06F 1/32* (2006.01)

(52) U.S. Cl. ........ 345/502; 345/503; 713/300; 713/320; 713/323; 713/324

(58) Field of Classification Search .................. 345/502, 345/503; 713/300, 320, 323, 324
See application file for complete search history.

(56) References Cited

U.S. PATENT DOCUMENTS

| | | | |
|---|---|---|---|
| 5,799,204 A * | 8/1998 | Pesto, Jr. ........................ | 710/10 |
| 6,460,125 B2 * | 10/2002 | Lee et al. ...................... | 711/167 |
| 6,473,086 B1 * | 10/2002 | Morein et al. ................. | 345/505 |
| 6,624,816 B1 * | 9/2003 | Jones, Jr. ....................... | 345/503 |
| 6,820,209 B1 * | 11/2004 | Culbert et al. ................ | 713/501 |
| 6,864,891 B2 * | 3/2005 | Myers ............................ | 345/502 |
| 6,950,105 B2 * | 9/2005 | Giemborek et al. .......... | 345/501 |
| 6,970,173 B2 * | 11/2005 | Ciolac ............................ | 345/544 |
| 6,985,152 B2 * | 1/2006 | Rubinstein et al. ........... | 345/520 |
| 7,019,752 B1 * | 3/2006 | Paquette et al. ............... | 345/543 |
| 7,330,922 B2 * | 2/2008 | Paquette et al. ............... | 710/302 |
| 7,492,369 B2 * | 2/2009 | Booth, Jr. ...................... | 345/537 |
| 7,657,686 B2 * | 2/2010 | Paquette et al. ............... | 710/302 |
| 7,663,635 B2 * | 2/2010 | Rogers et al. ................. | 345/568 |
| 7,698,579 B2 * | 4/2010 | Hendry et al. ................ | 713/300 |
| 7,721,118 B1 * | 5/2010 | Tamasi et al. ................. | 713/300 |
| 7,730,336 B2 * | 6/2010 | Marinkovic et al. .......... | 713/320 |
| 7,734,943 B2 * | 6/2010 | Whelan et al. ................ | 713/324 |
| 7,755,633 B2 * | 7/2010 | Booth, Jr. ...................... | 345/537 |
| 7,817,155 B2 * | 10/2010 | Litchmanov ................... | 345/504 |
| 7,861,013 B2 * | 12/2010 | Hunkins et al. ................ | 710/30 |
| 7,917,678 B2 * | 3/2011 | Paquette et al. ............... | 710/302 |
| 2005/0244131 A1 * | 11/2005 | Uehara ............................ | 386/46 |
| 2005/0278559 A1 * | 12/2005 | Sutardja et al. ............... | 713/320 |
| 2005/0285863 A1 * | 12/2005 | Diamond ....................... | 345/519 |
| 2007/0239913 A1 * | 10/2007 | Knepper et al. ............... | 710/104 |
| 2008/0028408 A1 * | 1/2008 | Day et al. ....................... | 718/104 |
| 2008/0204460 A1 * | 8/2008 | Marinkovic et al. .......... | 345/502 |
| 2008/0307365 A1 * | 12/2008 | Louch et al. ................... | 715/838 |
| 2009/0079746 A1 * | 3/2009 | Howard et al. ................ | 345/502 |
| 2010/0138675 A1 * | 6/2010 | Nikazm et al. ................ | 713/300 |
| 2011/0063308 A1 * | 3/2011 | Hunkins et al. ............... | 345/505 |

* cited by examiner

*Primary Examiner* — Daniel Washburn
(74) *Attorney, Agent, or Firm* — Patterson & Sheridan, LLP (57) ABSTRACT

One embodiment of the present invention sets forth a technique for dynamically switching between a power-saving integrated graphics processing unit (IGPU) and a higher-performance discrete graphics processing unit (DGPU). This technique uses a single graphics driver and a single digital-to-analog converter (DAC) and leverages the GPU switching capability of the operating system to ensure a seamless transition. When additional graphics performance is desired, the system enters a hybrid graphics mode. In this mode, the DGPU is powered-up, and the graphics driver maintains the current display, while the operating system switches applications running on the IGPU to the DGPU. While in the hybrid graphics mode, the DGPU performs the graphics processing, and the graphics driver transmits the rendered images from the DGPU to the IGPU local memory and, then, to the IGPU DAC. This image transmission allows applications to fully exploit the processing capabilities of the DGPU, while using the display device connected to the IGPU.

21 Claims, 6 Drawing Sheets

SYSTEM AND METHOD FOR SWITCHING BETWEEN GRAPHICAL PROCESSING UNITS

BACKGROUND OF THE INVENTION

1. Field of the Invention

The present invention relates generally to the field of graphics processing and more specifically to a system and method for switching between graphical processing units.

2. Description of the Related Art

A typical computing system includes a central processing unit (CPU), a graphics processing unit (GPU), a system memory, a display device, and an input device. A variety of software applications may run on the computing system. The CPU usually executes the overall structure of the software application and configures the GPU to perform specific tasks in the graphics pipeline (the collection of processing steps performed to transform 3-D images into 2-D images). Some software applications, such as web browsers and word processors, perform well on most computing systems. Other software applications, such as modern 3-D games and video processors, are more graphics-intensive and may perform better on computing systems which include a relatively high performance GPU with a rich graphics feature set.

GPUs typically exhibit a trade-off between graphics performance and power consumption; GPUs with higher performance usually consume more power than GPUs with lower performance. This trade-off is exemplified by two types of GPUs: discrete GPUs (DGPUs) and integrated GPUs (IGPUs). A DGPU is often part of a discrete graphics card that includes dedicated memory and is plugged into a slot in the computing system. An IGPU is part of the main chipset that is wired into the motherboard of the computing system and may share the system memory with the CPU. Typically, a DGPU has higher performance, but consumes more power than an IGPU. For running graphics-intensive software applications, a DPGU may be preferred. However, for running less demanding software applications on a laptop, an IGPU may provide adequate performance while maximizing the battery life.

Some computing systems include both a DGPU and an IGPU, allowing the user to tune the graphics performance and the power consumption of the computing system based on the situation. In such a computing system, the user may choose to maximize graphics performance by using the DGPU or to minimize power consumption by using the IGPU. In one approach to setting the desired graphics performance, the user attaches the display to the desired GPU. In such an approach, to switch from the high-performance DGPU to the power-saving IGPU, the user manually unplugs the display device from the video connector for the DGPU and subsequently the user plugs the display device into the video connector for the IGPU. One drawback to this approach, however, is that it is manually intensive and time consuming. In addition, the display will be blank during the GPU transition. In another approach, a manual switch is used to select between the DGPU and the IGPU, then the computing system is rebooted to effect the GPU change. This solution reduces the manual effort, but such a solution does not necessarily reduce the time required to switch between the GPUs. Furthermore, any running applications will terminate when the computing system is rebooted.

As the foregoing illustrates, what is needed in the art is a more flexible technique for switching between an IGPU and a DGPU in a computing system.

SUMMARY OF THE INVENTION

One embodiment of the present invention sets forth a method for switching rendering operations from an integrated graphics processing unit (IGPU) to a discrete graphics processing unit (DGPU). The method includes the steps of causing a screen shot of a current display to be placed in a first DGPU display buffer included in a local memory of the IGPU, pointing an IGPU digital-to-analog converter (DAC) to the first DGPU display buffer, where the IGPU DAC is coupled to a display device, when queried by an operating system, communicating to the operating system that the DGPU is coupled to the display device, enabling the DGPU, and inserting rendered data from a local memory of the DGPU into the local memory of the IGPU for display.

One advantage of the disclosed method is that it enables application programs to operate using the either the IGPU or the DGPU without terminating the application programs or rebooting the computing device. And, since the display device may be driven by either GPU, switching between the GPUs may be accomplished without changing the connection to the display device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
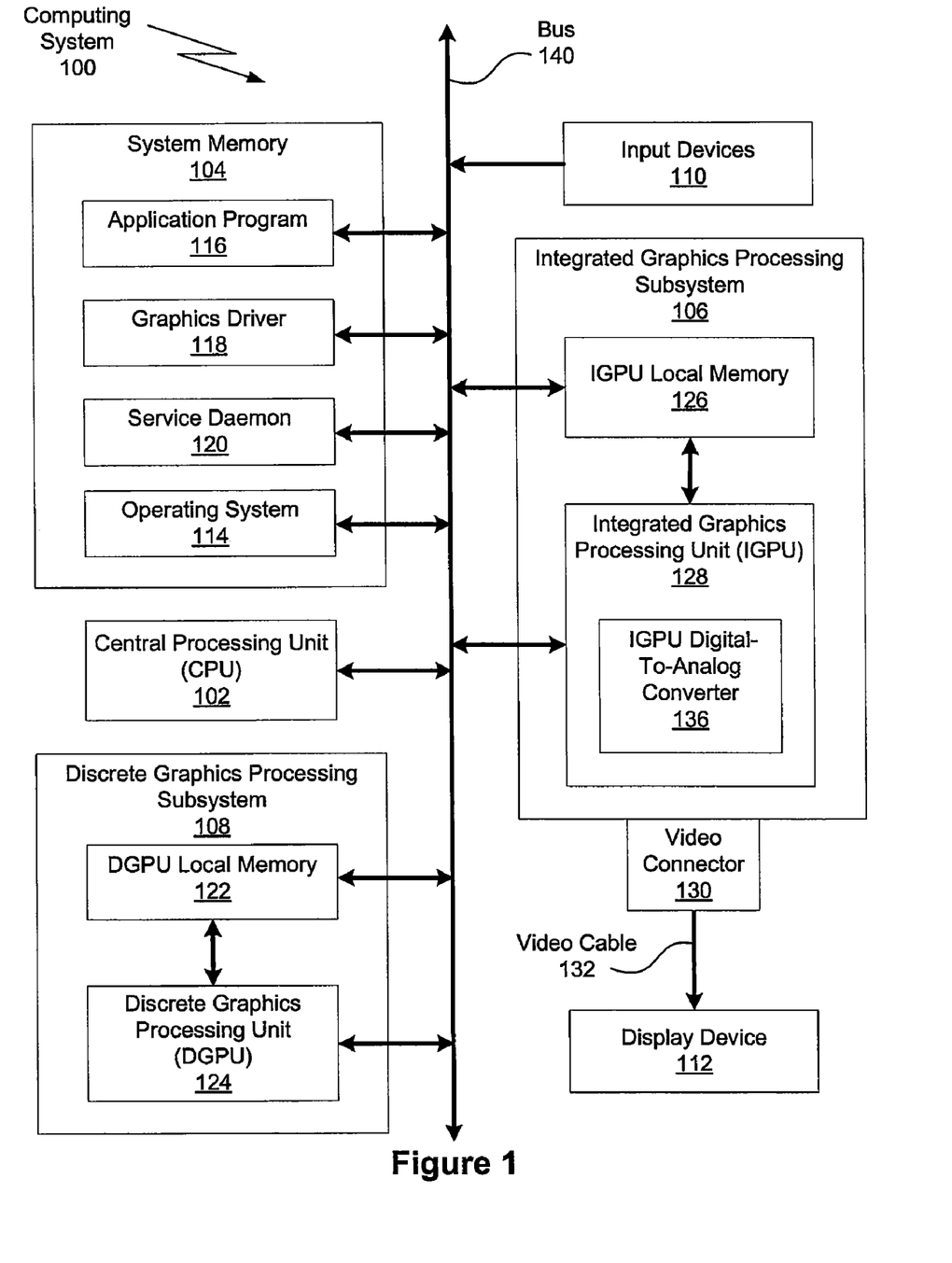
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a central processing unit (CPU) 102, input devices 110, a system memory 104, an integrated graphics processing subsystem 106, a discrete graphics processing system 108, a video cable 132, and a display device 110. In alternate embodiments, the CPU 102 and portions of the integrated graphics processing subsystem 106 may be integrated into a single processing unit. Communication paths interconnecting the various components in FIG. 1 may be implemented using any suitable bus or point-to-point communication protocol(s), and connections between different devices may use different protocols as is known in the art.

The CPU 102 connects to the input devices 110, the system memory 104, the integrated graphics processing subsystem 106, and the discrete graphics processing subsystem 108 via a bus 140. The CPU 102 receives user input from the input devices 110, executes programming instructions stored in the system memory 104, operates on data stored in the system memory 104, and configures either the integrated graphics processing subsystem 106 or the discrete graphics processing subsystem 108 to perform specific tasks in the graphics pipeline. In alternate embodiments, the CPU 102 may configure the integrated graphics processing subsystem 106 and the discrete graphics processing subsystem 108 to work together to perform specific tasks.

The system memory 104 typically includes dynamic random access memory (DRAM) used to store programming instructions and data for processing by the CPU 102, the integrated graphics processing subsystem 106, and the discrete graphics processing subsystem 108. The integrated graphics processing subsystem 106 and the discrete graphics processing subsystem 108 receive instructions transmitted by the CPU 102 and process the instructions in order to render graphics images. The integrated graphics processing subsystem 106 is configured to convey these rendered graphics images through the video cable 132 to the display device 112. In alternate embodiments, there may be additional display devices connected to either the integrated graphics processing subsystem 106 or the discrete graphics processing subsystem 108.

The system memory 104 includes an operating system (OS) 114, one or more application programs 116, a graphics driver 118, and one or more service daemons 120. The operating system 114 is typically the master control program of the computing system 100. Among other things, the operating system 114 manages the resources of the computing system 100, such as the system memory 104, and forms a software platform on top of which the application program(s) 116 may run. The applications program 116 transmits instructions that are designed to operate within the integrated graphics processing subsystem 106 or the discrete graphics processing subsystem 108 to the graphics driver 118. The graphics driver 118 is configured to translate these instructions into machine code programs that execute on components within the integrated graphics processing subsystem 106 and the discrete graphics processing subsystem 108. The service daemon 120 is a program that runs unattended and provides background services in the computing system 100, such as controlling the mail server, the printer, the web server, or the display. The service daemon 120 may make requests of other programs, such as the operating system 114, application program 116, and the graphics driver 118.

The integrated graphics processing subsystem 106 includes an integrated graphics processing unit (IGPU) 128, an IGPU local memory 126, and a video connector 130. In one embodiment, the IGPU 128 is part of the main chipset that is wired into the motherboard of the computing system 100. The IGPU 126 may receive instructions transmitted from the graphics driver 118, process the instructions in order to render graphics images, and store these images in the IGPU local memory 126. The IGPU 128 may be provided with any amount of IGPU local memory 126 and may use both IGPU local memory 126 and system memory 104. Further, in alternative embodiments, the IGPU local memory 126 may be incorporated into the system memory 104.

As also shown, the IGPU 128 includes an IGPU digital-to-analog converter (DAC) 136. The IGPU DAC 136 is configured to convert digital graphical images from the IGPU local memory 126 to analog graphics images and, then, transmit these analog graphics images through the video connector 130 and the video cable 132 to drive the display device 112. The video connector 130 may be any connector, such as a video graphics array (VGA) connector, capable of passing an analog graphics image through a video cable 132 to the display device 112. The display device 112 is an output device capable of emitting a visual image corresponding to an input graphics image. For example, the display device 112 may be built using a cathode ray tube (CRT) monitor, a liquid crystal display (LCD), or any other suitable display system. In some embodiments, there may be more than one display device 112 connected to the integrated graphics processing subsystem 106. In other embodiments, components within the integrated graphics processing subsystem 106 may also transmit digital graphics images from the IGPU local memory 126 directly through one or more connectors and video cables to one or more digital display devices. For example, components within the integrated graphics processing subsystem 108 may transmit digital graphics images from the IGPU local memory 126 through a digital video interface (DVI) connector and a cable to an LCD.

The computing system 100 also includes the discrete graphics processing subsystem 108. The discrete graphics processing subsystem 108 includes a discrete graphics processing unit (DGPU) 124 and a DGPU local memory 122. The discrete graphics processing subsystem 108 may be part of a discrete graphics card that is connected to the motherboard of the computing system 100 via an expansion slot (e.g., PCI Express or Accelerated Graphics Port). As previously described herein, the discrete graphics processing subsystem 108 has higher performance and a richer graphics feature set than the integrated processing subsystem 106, but consumes more power. The DGPU 126 may receive instructions transmitted from the graphics driver 118, processes the instructions in order to render graphics images, and store these images in the DGPU local memory 122. The DGPU 124 may be provided with any amount of DGPU local memory 122 and may use both the DGPU local memory 122 and system memory 104. As shown, the discrete graphics processing subsystem 108 is not connected directly to a display device. Instead, as set forth in greater detail herein, the graphics driver 118 may be configured to transmit the graphics images rendered by the DGPU 124 from the DGPU local memory 122 to the IGPU local memory 126, where the IGPU DAC 136 may convert these digital graphics images to analog graphics images. The IGPU DAC 126 then transmits these analog graphics images to the display device 112 that is connected to the integrated graphics processing subsystem 106.

In some embodiments, the discrete graphics processing subsystem 108 may also include a DAC and a video connector. This video connector may be attached to a display device. The DGPU 124 may render digital graphics images, use the DAC of the discrete graphics processing subsystem 108 to convert these digital graphics images to analog graphics images, and use these analog graphics images to drive the display device connected to the discrete graphics processing subsystem 108. Further, the DGPU 124 may also transmit the rendered digital graphics images to the IGPU local memory 126, where these images may also be used by the IGPU 128 to drive the display device 112 that is connected to the integrated graphics processing subsystem 106. For example, using this configuration, the computing system 100 may render graphics images on the DGPU 124 and, then, display these graphics images simultaneously on both a LCD panel of a laptop connected to the integrated graphics processing subsystem 106 and a projector connected to the discrete graphics processing subsystem 108.

Figure 2:
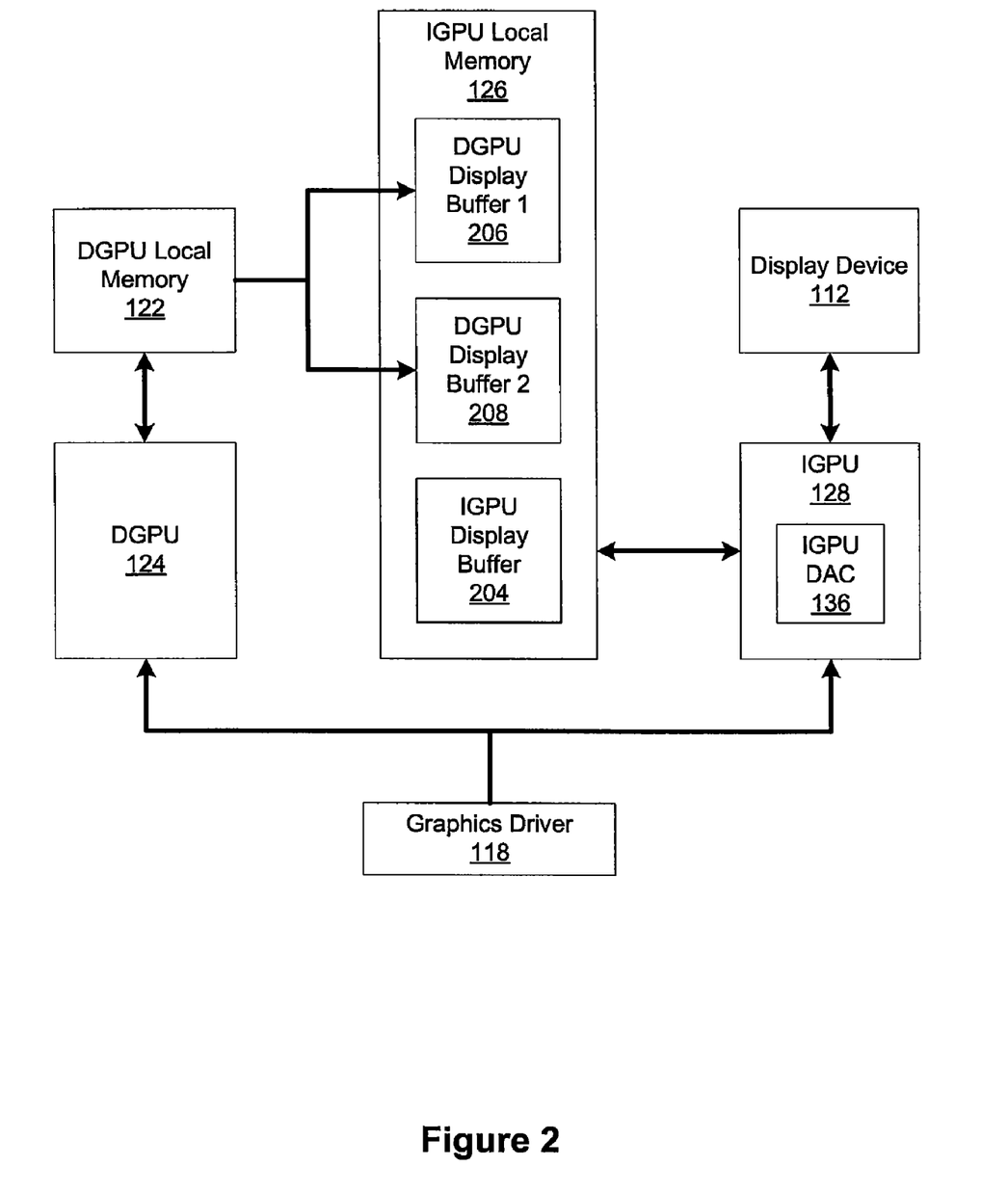
FIG. 2 is a conceptual diagram of certain elements in the computing system of FIG. 1 that enable different operating modes, according to one embodiment of the invention.

FIG. 2 is a conceptual diagram of certain elements in the computing system 100 of FIG. 1 that enable different operating modes, according to one embodiment of the invention. As shown, the computing system 100 uses a single graphics driver 118, a single DAC (the IGPU DAC 136), and a single display device 112 for displaying rendered graphics images. The computing system 100 may operate in either a power-saving integrated graphics mode, using the IGPU 136 to render graphics images, or a high-performance hybrid graphics mode, using the DGPU 124 to render graphics images. Further, the computing system 100 may be configured to switch between these two graphics modes dynamically, without rebooting the computing system 100 or reconnecting the display device 112. For example, the computing system 100 may be configured to switch to the hybrid graphics mode whenever an application program 116 needs the additional performance of the DGPU 124 or features that are provided only by the DGPU 124. In other embodiments, transitions between the two graphics modes may be triggered by events such as a switch to battery power or a certain type of user interaction.

The graphics driver 118 communicates with both the integrated graphics processing subsystem 106 and the discrete graphics processing subsystem 108 using a stream of commands called a "push buffer". The graphics driver 118 uses the push buffer to configure the integrated graphics processing subsystem 106 and the discrete graphics processing subsystem 108 to implement the graphics commands from the application program 116 (not shown in FIG. 2). While in the integrated graphics mode, the graphics driver 118 uses the IGPU 128 to both render and display graphics images. While in the hybrid graphics mode, the graphics driver 118 uses the DGPU 124 to render graphics images and the IGPU DAC 136 to display these images. Since, in this latter mode, the DGPU 124 is rendering the graphics images, the applications program 116 may use the full capabilities of the DGPU 124. The graphics driver 118 also uses the push buffer to transition between these two graphics modes.

When the computing system 100 is operating in the integrated graphics mode, the graphics driver 118 may disable the discrete graphics processing subsystem 108. Further, when the discrete graphics processing subsystem 108 is disabled, the service daemon 120 (also not shown in FIG. 2) may power down the discrete graphics processing subsystem 108 to reduce the power consumption of the computing system 100. When the computing system 100 is operating in the hybrid graphics mode, the graphics driver 118 may disable portions of the integrated graphics processing subsystem 106, but does not disable the IGPU DAC 136.

As shown, the IGPU local memory 126 includes an IGPU display buffer 204, a DGPU display buffer 1 206, and a DGPU display buffer 2 208. Again, the IGPU DAC 136 is configured to convert digital graphics images stored in the IGPU local memory 126 to analog graphics images that may drive the display device 112. In the integrated graphics mode, the graphics driver 118 configures the IGPU DAC 136 to display the graphics images stored in the IGPU display buffer 204. However, in the hybrid graphics mode, the graphics driver 118 configures the IGPU DAC 136 to alternatively display the graphics images stored in the DGPU display buffer 1 206 and the DGPU display buffer 2 208. Double-buffering the graphics images in this fashion allows the DGPU 124 to copy rendered graphics images to one DGPU display buffer 206 or 208 while the other DGPU display buffer 206 or 208 drives the IGPU DAC 136 and, thus, the display device 112. In alternative embodiments, the IGPU display buffer 204 may be replaced with two buffers, three buffers, or any other technically feasible buffering system. Similarly, in alternative embodiments, the DGPU display buffers 206 and 208 may be replaced with one buffer, three buffers, or any other technically feasible buffering system.

Since the computing system 110 and the display device 112 may be continually powered-up, the graphics driver 118 uses the push buffer to synchronize the display buffer-flips (transitions from displaying one buffer to another) to avoid glitching and tearing of the images displayed on the display device 112. For example, during the transition from the integrated graphics mode to the hybrid graphics mode, the graphics driver 118 may use the push buffer to take a screen shot of the current display device 112 and place this image in the DGPU display buffer 1 206. Then, the graphics driver 118 may use the push buffer to execute a buffer-flip, setting the IGPU DAC 136 to display the contents of the DGPU display buffer 1 206 instead of the contents of the IGPU display buffer 204. Using this technique, the display device 112 continually displays the same image during the transition, thereby avoiding glitches. Subsequently, while in hybrid graphics mode, the graphics driver 112 uses a memory blit (a common process for copying the contents of a block of memory from one location to another) and a buffer-flip to drive the display device 112 using new graphics images rendered by the DGPU 124.

Suppose for example, that the DGPU display buffer 1 206 is driving the display device 112. A "present" command may trigger the graphics driver 118 to insert the following sequence of commands into the push buffer for purposes of driving the display device 112 using new graphics images rendered by the DGPU 124. First, the graphics driver 118 may insert a peer-to-peer direct memory access (DMA) blit command into the push buffer. This command copies graphics images that are rendered by the DGPU 124 from the DGPU local memory 122 to the DGPU display buffer 2 208 within the IGPU local memory 126. Second, the graphics driver 118 may insert a buffer-flip command to point the IGPU DAC 136 to the DGPU display buffer 2 208 instead of the DGPU display buffer 1 206. The graphics driver 118 synchronizes the buffer-flip and the scan-out of the IGPU DAC 136 in any technically feasible fashion to avoid flickering and tearing the graphics images displayed on the display device 112

Figure 3:
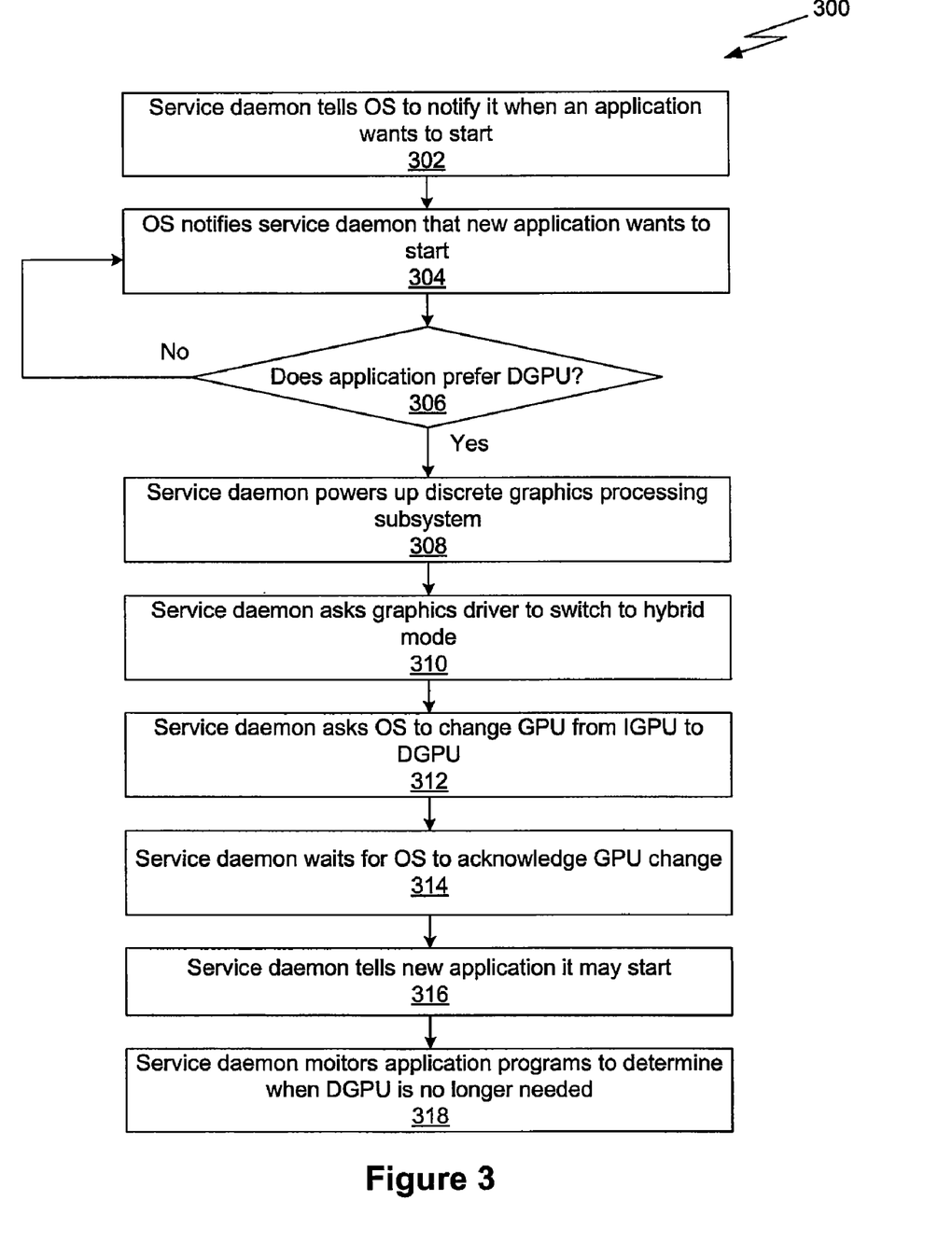
FIG. 3 is a flow diagram of method steps for transitioning to a hybrid graphics mode, according to one embodiment of the invention.

FIG. 3 is a flow diagram of method steps for transitioning to a hybrid graphics mode, according to one embodiment of the invention. Although the method steps are described in conjunction with the systems for FIGS. 1-2, persons skilled in the art will understand that any system that performs the method steps, in any order, is within the scope of the invention.

As shown, the method 300 begins at step 302, where the computing system 100 of FIG. 1 is operating in the integrated graphics mode and the service daemon 120 tells the operating system 114 to notify the service daemon 120 whenever a new application program 116 wants to start execution. In step 304, the operating system 114 notifies the service daemon 120 that a new application program 116 wants to start execution. At step 306, the service daemon 120 may evaluate the new application program 116 to determine if the application program 116 would benefit from the additional graphics performance of the DGPU 124. The service daemon 120 may perform this evaluation in any technically feasible fashion. For example, the service daemon 120 may compare the name of the application program 116 to see if it matches any of the names in a list of application programs that are to be run using the DGPU 124. If the service daemon 120 determines that the application program 116 is to be run using the IGPU 128, then the computing system 100 continues to operate in the integrated graphics mode, and the method 300 returns to step 304, where the service daemon 120 waits for another application program 116 to start execution. However, if the service daemon 120 determines that the application program 116 is to be run using the DGPU 124, then the method proceeds to step 308.

In step 308, the service daemon 120 powers up the discrete graphics processing subsystem 108. In step 310, the service daemon 120 asks the graphics driver 118 to switch to the hybrid graphics mode. Note that this step is described in greater detail below in conjunction with FIG. 5. In step 312, the service daemon 120 asks the operating system 114 to change the GPU that renders the graphics images for the computing system 100 from the IGPU 128 to the DGPU 124. During step 312, the capability of the operating system 114 to switch GPUs is leveraged to switch all application programs currently running on the operating system 114 from using the IGPU 128 to render graphics images to using the DGPU 124 to render graphics images. The step 312 is a specific application of the method steps executed by the operating system 114 to switch GPUs, which are described in greater detail below in conjunction with FIG. 4. At step 314, the service daemon 120 waits for the operating system 114 to acknowledge that the GPU has been successfully switched to the DGPU 124. In step 316, the service daemon 120 tells the application program 116 that it may start execution. Since the computing system 100 is now operating in the hybrid graphics mode, the application program 116 will use the DGPU 124 to render graphics images. Further, all application programs that start while the computing system 100 is operating in hybrid graphics mode will automatically use the DGPU 124 to render graphics images.

In step 318, the service daemon 120 continually monitors the application programs, including the application program 116, to determine when the additional graphics processing power of the DGPU 124 is no longer needed. When the service daemon 120 makes such a determination, the service daemon 120 switches the computing system 100 from using the hybrid graphics mode back to using the integrated graphics mode. The method steps associated with this switch are detailed in FIG. 6.

Figure 4:
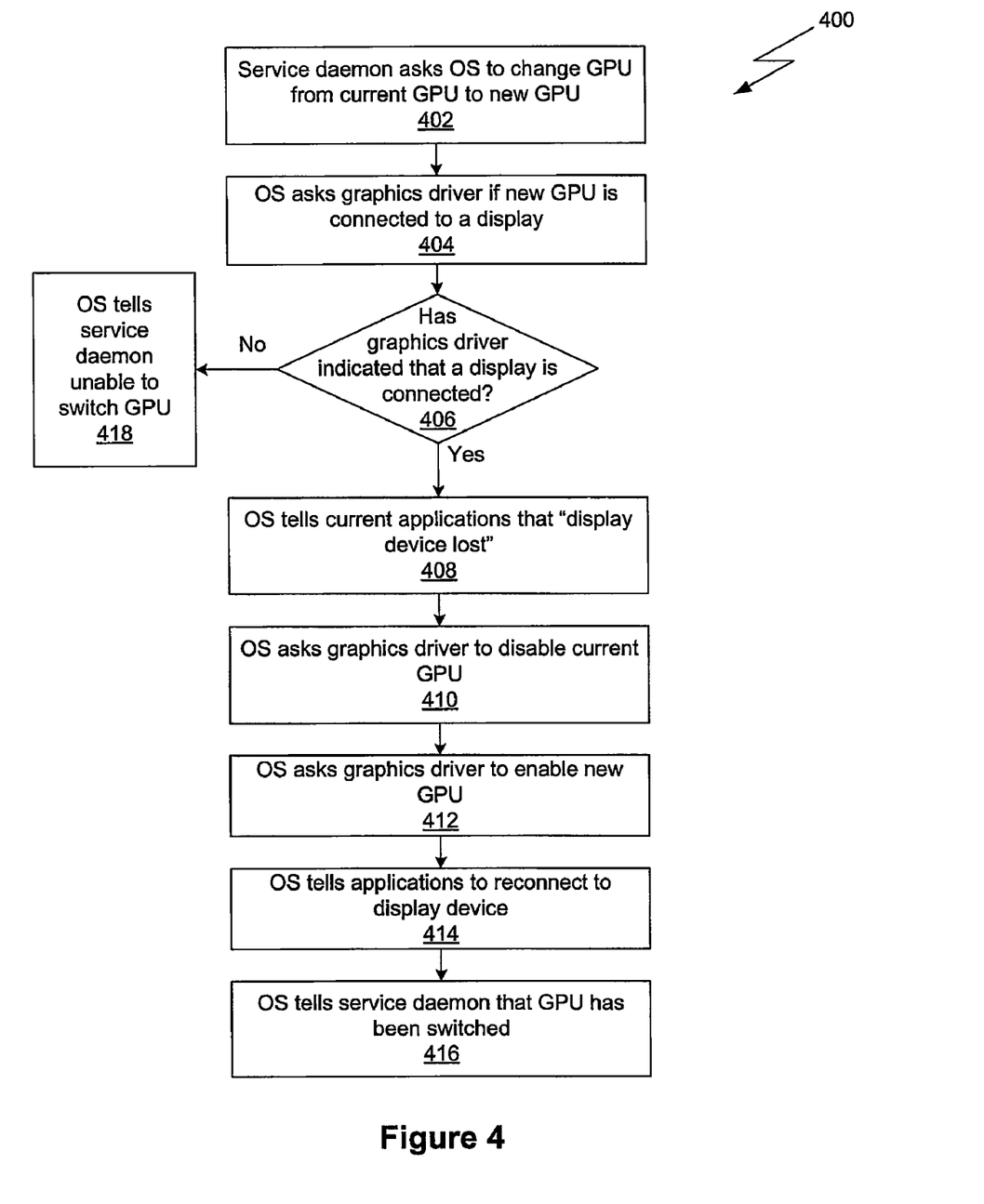
FIG. 4 is a flow diagram of method steps executed by the operating system to switch the GPU that renders the graphics images for the computing system, according to one embodiment of the invention.

FIG. 4 is a flow diagram of method steps executed by the operating system 114 to switch the GPU that renders the graphics images for the computing system 100 of FIG. 1, according to one embodiment of the invention. Although the method steps are described in conjunction with the systems for FIGS. 1-2, persons skilled in the art will understand that any system that performs the method steps, in any order, is within the scope of the invention. The method 400 is a generic example of the typical steps executed by an operating system to switch the GPU that renders the graphics images for a computing system. The methods 300 of FIG. 3, 500 of FIG. 5, and 600 of FIG. 6 leverage this generic behavior of the operating system to effect seamless transitions between operating the computing system 100 in the integrated graphics mode and the hybrid graphics mode. For example, as previously described herein, in step 312 of FIG. 3 the service daemon 120 asks the operating system 114 to change the GPU that renders the graphics images for the computing system 100 from the IGPU 128 to the DGPU 124.

The method 400 begins at step 402, where the service daemon 120 asks the operating system 114 to switch the GPU that renders the graphics images for the computing system 100 from the current GPU to a new GPU. In step 404, the operating system 114 asks the graphics driver 118 if the new GPU is connected to a display device, such as the display device 112. At step 406, if the graphics driver 118 says that there is no display device connected to the new GPU, then the operating system 114 proceeds to step 418. In step 418, the operating system 114 tells the service daemon 120 that the operating system 114 was unable to switch the GPU, and the method 400 terminates. However, at step 406, if the graphics driver 118 says that there is a display device connected to the new GPU, then the method 400 proceeds to step 408.

In step 408, the operating system 114 tells the application programs 116 that are using the current GPU that the display device is lost. The applications programs 116 may respond to this notification by suspending certain commands until the operating system 114 notifies the applications programs 116 that a display device is, again, available. In step 410, the operating system 114 asks the graphics driver 118 to disable the current GPU. In step 412, the operating system 114 asks the graphics driver 118 to enable the new GPU. In step 414, the operating system 114 tells the application programs 116 to reconnect to the display device connected to the new GPU. Advantageously, by reconnecting in this fashion, the application programs 116 interact with the new GPU, thus all subsequent graphics calls utilize the full capabilities of the new GPU. In step 416, the operating system 114 informs the service daemon 120 that the GPU has been successfully switched, and the method 400 terminates.

Figure 5:
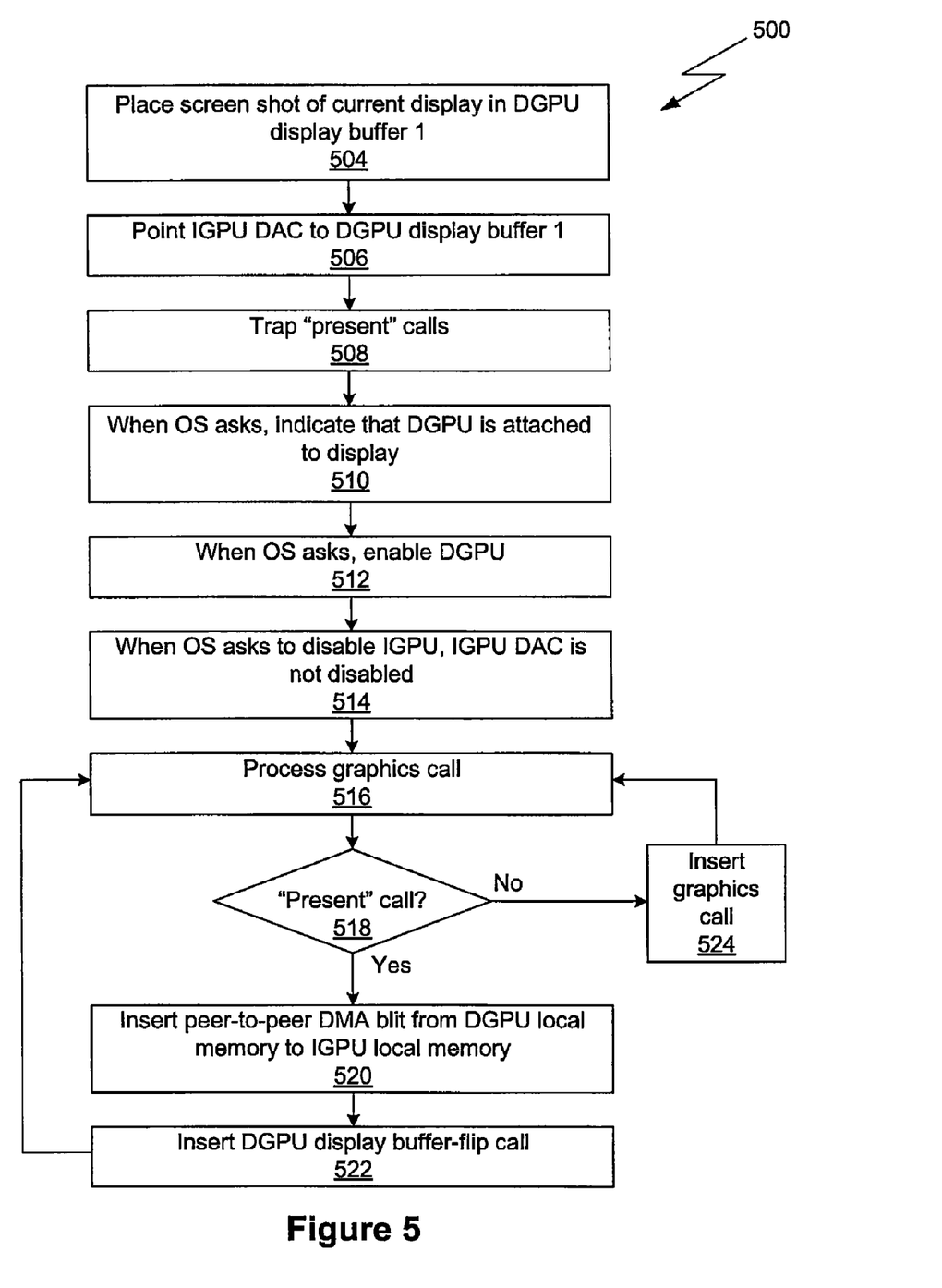
FIG. 5 is a flow diagram of method steps executed by the graphics driver for transitioning to and operating in the hybrid graphics mode from the integrated graphics mode, according to one embodiment of the invention.

FIG. 5 is a flow diagram of method steps executed by the graphics driver 118 for transitioning to and operating in the hybrid graphics mode from the integrated graphics mode, according to one embodiment of the invention. Although the method steps are described in conjunction with the systems for FIGS. 1-2, persons skilled in the art will understand that any system that performs the method steps, in any order, is within the scope of the invention.

As shown, the method 500 begins at step 504, where the graphics driver 118 uses the push buffer to configure the IGPU 128 to place a screen shot of the current display device 112, which is connected to the integrated graphics processing subsystem 106, in the DGPU display buffer 1 206 within the IGPU local memory 126. In step 506, the graphics driver 118 uses the push buffer to configure the IGPU DAC 136 to display the contents of the DGPU display buffer 1 206 instead of the contents of the IGPU display buffer 204. In various embodiments, the graphics driver 118 may synchronize this buffer-flip with the scan-out of the IGPU DAC 136 to ensure that the display device 112 maintains a consistent image and does not flicker during this transition to the hybrid graphics mode. In step 508, the graphics driver 118 configures itself to trap and hold any received graphics calls that involve updating the display, such as "present" calls, until the transition to the hybrid graphics mode is complete. Advantageously, when the application programs 116 disconnect from the IGPU 128 in step 408 of method 400, the IGPU DAC 136 will continue to display the screen shot taken in step 502.

In step 510, the graphics driver 118 waits for the operating system 112 to ask the graphics driver 118 if the DGPU 124 is connected to a display device. As shown in the computing system 100 of FIG. 2, the DGPU 124 is not directly attached to a display device. If the graphics driver 118 were not transitioning into the hybrid graphics mode, then the graphics driver 118 would determine that the DGPU 124 was not connected to a display device and would relay this response to the operating system 112. However, since the graphics driver 118 is transitioning into the hybrid graphics mode, the graphics driver 118 is configured to inform the operating system 112 that the DGPU 124 is connected to a display device— display device 112. Informing the operating system 112 that the DGPU 124 is connected to the display device 112 in this manner allows the operating system 112 to successfully execute the method 400, thereby changing the primary display to the DGPU 124.

In step 512, the graphics driver 118 waits for the operating system 112 to ask the graphics driver 118 to enable the DGPU 124. After the graphics driver 118 enables the DGPU 124, then the method proceeds to step 514. In step 514, the graphics driver 118 waits for the operating system 112 to ask the graphics driver 118 to disable the IGPU 124. As detailed above in conjunction with FIG. 2, while in hybrid graphics mode, the graphics driver 118 uses the IGPU DAC 136 to display the graphics images rendered by the DGPU 124. Therefore, in step 514, the graphics driver 118 does not disable the entire IGPU 124. Instead, the graphics driver 118 disables most of the IGPU 124, but keeps the IGPU DAC 136 alive. This technique permits the DGPU 124 to use the IGPU DAC 136 and the display device 112 without being directly connected to the display device 112. The graphics driver 118 then begins operating in the hybrid graphics mode.

In step 516, the graphics driver 118 processes a graphics call from one of the application programs 116. At step 518, the graphics driver 118 determines if the graphics call is an update to the display device 112, such as a "present" call. If the graphics call is not an update to the display device 112, then the graphics driver 118 proceeds to step 524. In step 524, the graphics driver 118 inserts a command into the push buffer to configure the DGPU 124 to execute the graphics call. However, if the graphics call is an update to the display device 112, then the graphics driver 118 intercepts the graphics call and executes steps 520 and 522.

In steps 520 and 522, the graphics driver 118 manipulates the push buffer to ensure that the graphics images currently rendered on the DGPU 124 are used to drive the display device 112. More specifically, in step 520, the graphics driver 118 inserts a peer-to-peer DMA blit command into the push buffer. This command configures the DGPU 124 to copy the graphics images that are rendered on the DGPU from the DGPU local memory 122 to one of the two DGPU display buffers 204 and 206 within the IGPU local memory 126. Since, at any point, one of the DGPU display buffers 204 or 206 is being used to drive the display device 112, the graphics driver 118 selects the other DGPU display buffer 204 or 206 as the recipient of this blit operation. In step 522, the graphics driver 118 inserts a buffer-flip call into the push buffer. The buffer-flip call configures the IGPU DAC 136 to point to the DGPU display buffer 204 or 206, as the case may be, that was the recipient of the rendered graphics image in step 520. Thereinafter, the IGPU DAC 136 displays the graphics images rendered by the DGPU 124 on the display device 112.

After completing either step 522 or 524, the method 500 returns to step 516 where the graphics driver 118 processes the next graphics call. The method 500 continues to execute steps 516 through 524, processing graphics calls from the application programs 116, until the graphics driver 118 receives a request to transition out of the hybrid graphics mode, back to the integrated graphics mode.

Figure 6:
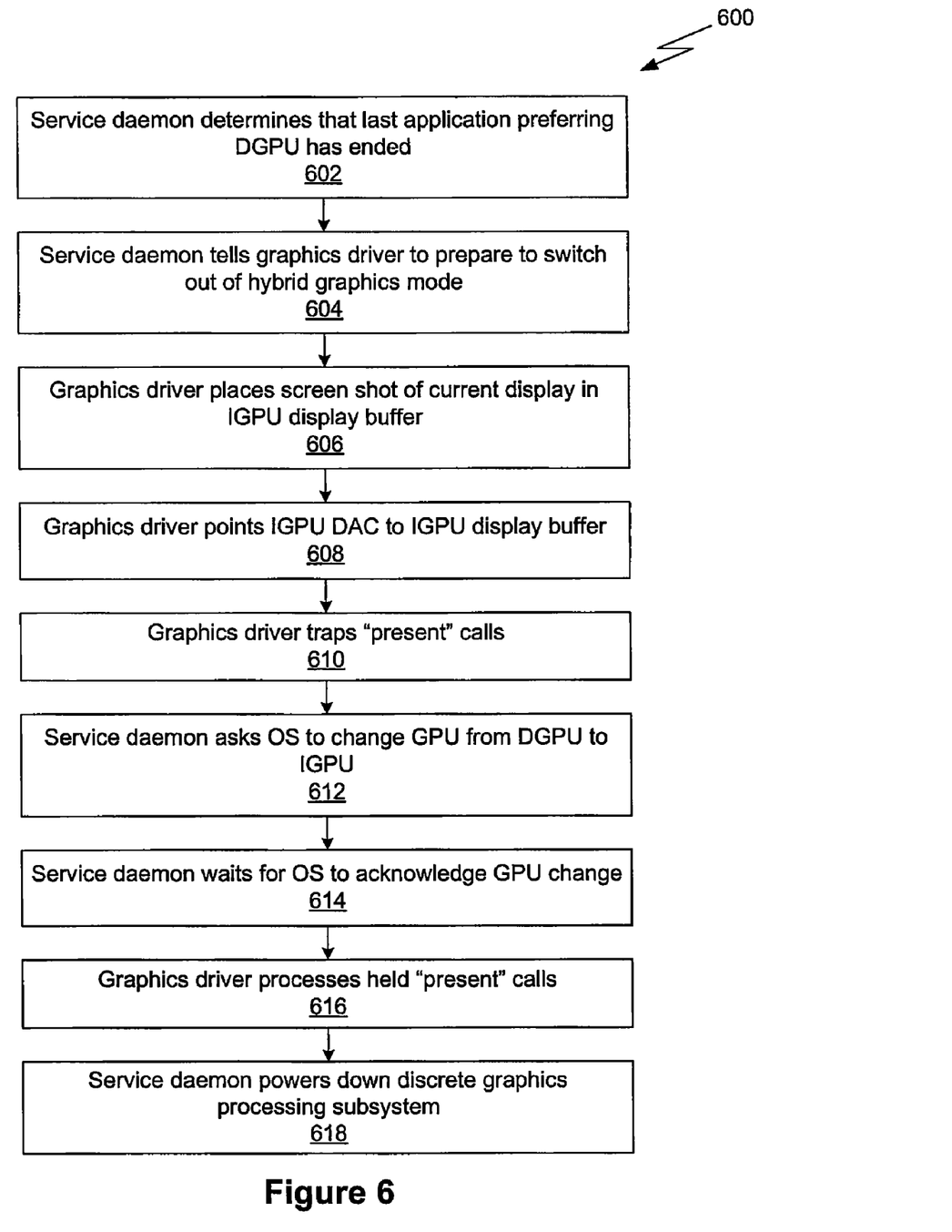
FIG. 6 is a flow diagram of method steps for transitioning from the hybrid graphics mode to the integrated graphics mode, according to one embodiment of the invention.

FIG. 6 is a flow diagram of method steps for transitioning from the hybrid graphics mode to the integrated graphics mode, according to one embodiment of the invention. Although the method steps are described in conjunction with the systems for FIGS. 1-2, persons skilled in the art will understand that any system that performs the method steps, in any order, is within the scope of the invention.

The method 600 begins at step 602, where the service daemon 120 determines that the last of the application programs 116 that are to be run using the DGPU 124 has terminated. In step 604, the service daemon 120 tells the graphics driver 118 to prepare to switch from the hybrid graphics mode to the integrated graphics mode. In step 606, the graphics driver 118 uses the push buffer to configure the DGPU 124 to place a screen shot of the current display device 112 in the IGPU display buffer 204. In step 608, the graphics driver 118 uses the push buffer to configure the IGPU DAC 136 to display the contents of the IGPU display buffer 204. In step 610, the graphics driver 118 configures itself to trap and hold any received graphics calls that involve updating the display, such as "present" calls, until the transition to the integrated graphics mode is complete. The steps 606 through 610 ensure that the display device 112 continues to display the current screen shot until the computing system 100 begins operating in the integrated graphics mode.

In step 612, the service daemon 120 asks the operating system 114 to change the GPU that renders the graphics images for the computing system 100 from the DGPU 124 to the IGPU 128. This step is described above in conjunction with FIG. 4. As part of step 612, the application programs 116 that are currently running on the operating system 114 disconnect from the DGPU 124 and reconnect to the IGPU 128. Thus, subsequent graphics calls received from the application programs 116 are automatically subject to the limitations of the IGPU 128. In step 614, the service daemon 120 waits for the operating system 112 to acknowledge the GPU change. In step 616, the graphics driver 118 processes any held "present" calls and resumes processing all graphics calls, rendering and displaying using the IGPU 128. In step 618, the service daemon 120 powers down the discrete graphics processing subsystem 108, and the method 600 terminates. Powering-down the discrete graphics processing subsystem 108 may lead to considerable power savings as the computing system 100 continues to operate, which, among other things, can lead to prolonged battery life if the computing system 100 is a laptop running on battery power.

In sum, the graphics performance and the power consumption of a computing device may be tuned by dynamically switching between GPUs. In one embodiment, the computing system includes a single graphics driver, an IGPU, a DGPU, and a single display device connected to the IGPU DAC. When a graphically-intensive application program starts, the server daemon may configure the graphics driver to operate in a hybrid graphics mode to maximize the graphics performance of the computing system. In this mode, the graphics driver renders graphic images using the DGPU, transmits the rendered graphics images from the DGPU local memory to the IGPU local memory using a peer-to-peer DMA blit, and displays the rendered graphics images on the display device using the IGPU DAC. When less demanding applications programs are running, the server daemon may configure the graphics driver to operate in an integrated graphics mode, powering-down the DGPU to minimize the power consumption of the computing device. In this mode, the graphics driver renders and display graphics images using the IGPU.

While transitioning between GPUs, the graphics driver configures the IGPU DAC to display a screen shot of the last display image rendered by the current GPU so that the display device does not glitch. Furthermore, the graphics driver modifies the inherent GPU switching behavior of the operating system to disconnect running application programs from the current GPU and subsequently reconnect these application programs to the new GPU. Advantageously, this technique allows the application programs to operate using the new GPU without terminating the application programs or rebooting the computing system. And, since the display device may be driven by either GPU, switching between the GPUs may be accomplished without changing the connection to the display device.

While the foregoing is directed to embodiments of the present invention, other and further embodiments of the invention may be devised without departing from the basic scope thereof. For example, the discrete graphics processing subsystem may include multiple GPUs linked together to render graphics images in parallel. Also, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A method for managing a switch from an integrated graphics processing unit (IGPU) to a discrete graphics processing unit (DGPU) for rendering operations, the method comprising:
    receiving a notification from an operating system that an application wants to begin execution;
    determining that the application should be executed using the DGPU instead of the IGPU, wherein the IGPU includes a first memory that includes a first buffer, a second buffer and a third buffer, the first and second buffers each corresponding to the DGPU, and the third buffer corresponding to the IGPU;
    powering on a discrete graphics processing subsystem that includes the DGPU, wherein the DGPU includes a second memory; and
    instructing a graphics driver to switch to a hybrid processing mode that uses the DGPU for rendering operations, wherein the DGPU is configured, when switching to the hybrid processing mode, to store rendered data in the first or second buffer.

2. The method of claim 1, wherein switching to a hybrid processing mode comprises the graphics driver, when queried by the operating system, indicating that the DGPU is coupled to a display device, and, when asked by the operating system to disable the IGPU, disabling portions of the IGPU, but not an IGPU digital-to-analog converter coupled to the display device.

3. The method of claim 1, further comprising the step of instructing the operating system to switch from the IGPU to the DGPU.

4. The method of claim 3, wherein the operating system switching from the IGPU to the DGPU comprises the operating system asking the graphics driver whether the DGPU is coupled to a display device, receiving an indication from the graphics driver that the DGPU is coupled to the display device, telling one or more applications that the display device has been lost, requesting the graphics driver to disable the IGPU, requesting the graphics driver to enable the DGPU, and telling the one or more applications to reconnect to the display device.

5. The method of claim 3, further comprising the step of receiving an acknowledgement from the operating system that the switch from the IGPU to the DGPU has been completed.

6. The method of claim 5, further comprising the step of instructing the application to begin execution.

7. The method of claim 6, further comprising the step of monitoring all applications executing on the DGPU to determine when the DGPU is no longer needed.

8. The method of claim 1, further comprising the step of instructing the operating system to transmit a notification when the application wants to begin execution.

9. A non-transitory computer-readable medium including instructions that, when executed by a processing unit, cause the processing unit to manage a switch from an integrated graphics processing unit (IGPU) to a discrete graphics processing unit (DGPU) for rendering operations, by performing the steps of:
    receiving a notification from an operating system that an application wants to begin execution;
    determining that the application should be executed using the DGPU instead of the IGPU, wherein the IGPU includes a first memory that includes a first buffer, a second buffer and a third buffer, the first and second buffers each corresponding to the DGPU, and the third buffer corresponding to the IGPU;
    powering on a discrete graphics processing subsystem that includes the DGPU, wherein the DGPU includes a second memory; and
    instructing a graphics driver to switch to a hybrid processing mode that uses the DGPU for rendering operations, wherein the DGPU is configured, when switching to the hybrid processing mode, to store rendered data in the first or second buffer.

10. The non-transitory computer-readable medium of claim 9, further comprising the step of instructing the operating system to switch from the IGPU to the DGPU.

11. The non-transitory computer-readable medium of claim 10, further comprising the step of receiving an acknowledgement from the operating system that the switch from the IGPU to the DGPU has been completed.

12. The non-transitory computer-readable medium of claim 11, further comprising the step of instructing the application to begin execution.

13. The non-transitory computer-readable medium of claim 12, further comprising the step of monitoring all applications executing on the DGPU to determine when the DGPU is no longer needed.

14. The non-transitory computer-readable medium of claim 9, further comprising the step of instructing the operating system to transmit a notification when the application wants to begin execution.

15. A computing device, comprising:
    an integrated graphics processing unit (IGPU);
    a discrete graphics processing unit (DGPU); and
    a service daemon configured to manage a switch from the IGPU to the DGPU for rendering operations by performing the steps of:
        receiving a notification from an operating system that an application wants to begin execution,
        determining that the application should be executed using the DGPU instead of the IGPU, wherein the IGPU includes a first memory that includes a first buffer, a second buffer and a third buffer, the first and second buffers each corresponding to the DGPU, and the third buffer corresponding to the IGPU, powering on a discrete graphics processing subsystem that includes the DGPU, wherein the DGPU includes a second memory, and instructing a graphics driver to switch to a hybrid processing mode that uses the DGPU for rendering operations, wherein the DGPU is configured, when switching to the hybrid processing mode, to store rendered data in the first or second buffer.

16. The computing device of claim 15, wherein the service daemon is further configured to instruct the operating system to switch from the IGPU to the DGPU.

17. The computing device of claim 16, wherein the service daemon is further configured to receive an acknowledgement from the operating system that the switch from the IGPU to the DGPU has been completed.

18. The computing device of claim 17, wherein the service daemon is further configured to instruct the application to begin execution.

19. The computing device of claim 18, wherein the service daemon is further configured to monitor all applications executing on the DGPU to determine when the DGPU is no longer needed.

20. The computing device of claim 15, wherein the service daemon is further configured to instruct the operating system to transmit a notification when the application wants to begin execution.

21. A method for managing a switch from an integrated graphics processing unit (IGPU) to a discrete graphics processing unit (DGPU) for rendering operations, the method comprising:

powering on an integrated graphics processing subsystem that includes the IGPU, wherein the IGPU includes a first memory that includes an IGPU display buffer, a first buffer and a second buffer, and the first and second buffers each associating with the DGPU;

configuring an IGPU digital-to-analog converter to drive a display device to display graphics images stored in the IGPU display buffer;

powering on a discrete graphics processing subsystem that includes the DGPU, wherein the DGPU includes a second memory;

instructing a graphics driver to switch from an integrated graphics mode to a hybrid processing mode that uses the DGPU for rendering operations, wherein the DGPU is configured, when switching to the hybrid processing mode, to store rendered graphics images presented on the display device in the first or second buffer; and configuring the IGPU digital-to-analog converter to drive the display device to display the rendered graphics images stored in the first or second buffer such that the display device continually displays the same image during the switch.

* * * * *